(12) United States Patent
Joshi et al.

(10) Patent No.: US 6,987,890 B2
(45) Date of Patent: Jan. 17, 2006

(54) PRODUCING AND ENCODING RATE-DISTORTION INFORMATION ALLOWING OPTIMAL TRANSCODING OF COMPRESSED DIGITAL IMAGE

(75) Inventors: Rajan L. Joshi, Pittsford, NY (US); Aaron T. Deever, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 645 days.

(21) Appl. No.: 10/108,151

(22) Filed: Mar. 27, 2002

(65) Prior Publication Data

US 2003/0185453 A1 Oct. 2, 2003

(51) Int. Cl.
*G06K 9/46* (2006.01)
*H04N 7/12* (2006.01)

(52) U.S. Cl. .................. 382/240; 382/232; 375/240.19
(58) Field of Classification Search ........ 382/232–233, 382/239–240, 251, 275; 375/240.19, 240.21, 375/254; 348/27
See application file for complete search history.

(56) References Cited

U.S. PATENT DOCUMENTS

| | | | | |
|---|---|---|---|---|
| 6,091,773 A | * | 7/2000 | Sydorenko | 375/240.03 |
| 6,128,346 A | * | 10/2000 | Suarez et al. | 375/254 |
| 6,148,110 A | * | 11/2000 | Yajima et al. | 382/240 |
| 6,327,392 B1 | * | 12/2001 | Li | 382/248 |
| 6,501,397 B1 | * | 12/2002 | Radha et al. | 341/60 |
| 6,650,782 B1 | * | 11/2003 | Joshi et al. | 382/239 |
| 6,668,090 B1 | * | 12/2003 | Joshi et al. | 382/239 |
| 6,697,521 B2 | * | 2/2004 | Islam et al. | 382/166 |
| 6,757,326 B1 | * | 6/2004 | Prieto et al. | 375/232 |
| 6,785,423 B1 | * | 8/2004 | Joshi et al. | 382/235 |
| 2003/0041258 A1 | | 2/2003 | Wee et al. | |

FOREIGN PATENT DOCUMENTS

| EP | 1 158 774 A | 11/2001 |
|---|---|---|
| WO | WO 02/32147 A1 | 4/2002 |

OTHER PUBLICATIONS

U.S. Appl. No. 09/898,230, filed Jul. 3, 2001, Rajan Joshi et al.
International Standard ISO/IEC 15444-1, Information technology—JPEG 2000—Image coding system, ITU Recommendation T.800.

(Continued)

*Primary Examiner*—Kanjibhai Patel
(74) *Attorney, Agent, or Firm*—David M. Woods

(57) ABSTRACT

A method for encoding rate-distortion information associated with the compression of an input digital image includes the steps of: computing rate and distortion-reduction values associated with each coding pass of each compressed codeblock bit-stream, and encoding rate and distortion-reduction values associated with coding passes contained in the final compressed bit-stream. A method for using encoded rate-distortion information associated with a compressed digital image bit-stream during transcoding of said compressed digital image bitstream includes the steps of: parsing the compressed digital image bit-stream to obtain compressed codeblock bit-streams, decoding the encoded RD information to obtain rate and distortion-reduction values associated with codeblock coding passes, and using such rate-distortion information to optimally transcode such compressed digital image bit-stream to form a new compressed digital image bit-stream at a given bit-rate, resolution, and for given visual weights.

19 Claims, 11 Drawing Sheets

OTHER PUBLICATIONS

"High Performance Scalable Image Compression with EBCOT" by David Taubman, IEEE Transactions on Image Processing, vol. 9, No. 7, pp. 1158–1170, Jul. 2000.

"Comparative study of wavelet and DCT decompositions with equivalent quantization and encoding strategies for medical images" by Paul W. Jones, Scott Daly, Roger S. Gaborski, and Majid Rabbani. Proc. SPIE Medical Imaging '95, vol. 2431, pp. 571–582.

Wee S.J. et al., "Secure Scalable Streaming Enabling Transcoding Without Decryption" Proceedings 2001 International Conference of Image Processing. ICIP 2001. Thessaloniki, Greece, Oct. 7–10, 2001, International Conference on Image Processing, New York, NY: IEEE, US, vol. 1 of 3. Conf. 8, Oct. 7, 2001, pp. 437–440, XP010564890, ISBN: 0-7803-6725-1.

Rabbani M. et al: "An Overview of the JPEG 1–10 2000 Still Image Compression Standard" Signal Processing. Image Communication, Elsevier Science Publishers, Amsterdam, NL., vol. 17, No. 1, Jan. 2002 pp. 3–48, XP004326797, ISSN: 0923-5965.

Taubman D.S. et al., "JPEG2000: Image Compression Fundamentals, Standards and Practice", JPEG2000 Image Compression Fundamentals, Standards and Practice, Kluwer International Series in Engineering and Computer Science, Norwell, MA: Kluwer Academic Publ., US, Jan. 1, 2002, pp. 327–396, XP002314176, ISSBN: 0-7923-7519-X, Chapter 8 "Highly Scalable Compression With Embedded Block Coding".

Joshi R. L. et al.: "Optimum Classification in Subband Coding of Images" Proceedings of the International Conference on Image Processing (ICIP) Austin, Nov. 13–16, 1994, Los Alamitos, IEEE Comp. Soc. Press, US, vol. 3, Conf. 1, Nov. 13, 1994, pp. 883–887, XP010146155, ISBN: 0-8186-6952-7.

Tanaka T. et al.: "Image Coding Using Vector–Embedded Karhunen–Loeve Transform" Image Processing, 1999. ICIP 99. Proceedings. 1999 International Conference on Kobe, Japan Oct. 24–28, 1999, Pistcatway, NJ, IEEE, US, vol. 1, Oct. 24, 1999, pp. 482–486, XP010369155, ISBN: 0-7803-5467-2.

* cited by examiner

PRODUCING AND ENCODING RATE-DISTORTION INFORMATION ALLOWING OPTIMAL TRANSCODING OF COMPRESSED DIGITAL IMAGE

FIELD OF INVENTION

This invention pertains to the field of image compression, and in particular to the use of rate-distortion information in relation to JPEG2000 compliant image compression.

BACKGROUND OF THE INVENTION

In recent years, many methods for subband or wavelet compression of images have been proposed. One such method is the JPEG2000 image compression standard, as described in "Information Technology—JPEG2000 Image Coding System, ISO/IEC International Standard 15444-1, ITU Recommendation T.800". The JPEG2000 standard is based on the EBCOT algorithm as described by Taubman (David Taubman, "High performance scalable compression with EBCOT," *IEEE Transactions on Image Processing*, 9(7), pp. 1158–1170, July 2000). The JPEG2000 encoder decomposes the image into a collection of subbands. Each subband is divided into rectangular blocks called codeblocks. Codeblocks are quantized and entropy coded independently in a number of coding passes. The compressed coding passes from each codeblock of each subband are aggregated to form quality layers. Each quality layer contains compressed data corresponding to a whole number of coding passes from each codeblock of each subband. A codeblock may contribute zero or more coding passes to a given layer. Adding more layers to the compressed bit-stream generally improves the visual quality of the reconstructed image while increasing the bit-rate. The JPEG2000 standard provides a very flexible framework for organizing and ordering the compressed bit-stream. For each layer, it is the responsibility of the encoder to determine how many coding passes from each codeblock will be included in that layer.

Taubman describes a method for the formation of layers in a JPEG2000 encoder. In his method, mean squared error (MSE) or visually weighted MSE is used as the distortion metric. Each subband is quantized using a very small step-size to produce many more coding passes than would be included in the final compressed bit-stream. Then, post-compression rate-distortion optimization is used to decide which coding passes should be discarded altogether, and also to decide how the layers are formed. Specifically, each layer contains coding passes that yield the greatest reduction in distortion for a given rate constraint. Once the encoding is complete, the rate-distortion information used in the layer formation process is discarded.

The loss of rate-distortion information leads to two limitations of this layer formation and encoding method. One limitation is that it may not be possible to transcode the compressed image to a lower bit-rate (possibly at a reduced resolution) in an optimal manner. If the transcoding request is made for the compressed image at a resolution and bit-rate that does not correspond to a layer boundary, the resulting transcoded data contains a partial layer and is suboptimal in terms of MSE or weighted MSE performance.

A second limitation is that when visual weights are used, layers are formed with respect to a specific visually weighted MSE distortion metric. However, the resulting order of the compressed bit-stream may be sub-optimal, if the image is to be transcoded using a different set of visual weights.

SUMMARY OF THE INVENTION

Accordingly, it is an object of the present invention to provide a method which encodes rate-distortion information along with a JPEG2000 compressed bit-stream to allow for optimal transcoding for arbitrary bit-rates, resolutions and viewing conditions.

The present invention is directed to overcoming one or more of the problems set forth above. Briefly summarized, according to one aspect of the present invention, the invention resides in a method for preserving rate-distortion information associated with the compression of an input digital image, comprising the steps of:

(a) decomposing the input digital image to produce a plurality of subbands, each subband having a plurality of subband coefficients;

(b) quantizing the plurality of subband coefficients of each subband of the decomposed input digital image to produce a quantized output value for each subband coefficient of each subband;

(c) partitioning each subband into a plurality of codeblocks;

(d) forming at least one bit-plane from the quantized output values of subband coefficients of each codeblock of each subband;

(e) entropy encoding each bit-plane of each codeblock for each subband in at least one pass to produce a compressed bit-stream corresponding to each pass, wherein each codeblock is entropy encoded independently of the other codeblocks;

(f) computing a rate value and a distortion-reduction value for each pass;

(g) providing a layer-table that specifies the number of expected layers and the criteria for forming the layers;

(h) using the computed rate and distortion-reduction values to identify a set of passes and their corresponding compressed bit-streams that are included in each layer specified in the layer-table;

(i) producing tagged rate and distortion-reduction tables from the computed rate values and distortion reduction values, wherein the rate values corresponding to passes which are segment boundaries are tagged;

(j) ordering the compressed bit-streams corresponding to passes into layers to produce a compressed digital image file, wherein each layer includes compressed bit-streams corresponding to passes, from the identified set for that layer, that have not been included in any previous layers; and (k) storing the tagged rate and distortion-reduction tables as rate-distortion information in association with the compressed digital image file.

It is a further object of the present invention to provide a method for using the encoded rate-distortion information associated with a JPEG2000 compressed bit-stream to optimally transcode the compressed bit-stream for a target bit-rate, resolution, and viewing conditions. Therefore, according to another aspect of the present invention, the compressed digital image is subsequently transcoded to a given bit-rate, resolution and viewing conditions, using its associated stored rate and distortion-reduction information according to the following steps:

(a) parsing the encoded digital image file to extract the compressed codeblock bit-streams and codeblock segment rates;

(b) extracting the rate and distortion-reduction values for the codeblock passes from the encoded rate-distortion information;

(c) providing a layer-table that specifies the number of expected layers and the criteria for forming the layers;

(d) using the extracted rate and distortion-reduction information to identify a set of passes and their corresponding compressed bit-streams that are included in each layer specified in the layer-table;

(e) producing tagged rate and distortion-reduction tables, wherein the rate values corresponding to passes which are segment boundaries are tagged; and (f) ordering the compressed bit-streams corresponding to passes into layers to produce a transcoded digital image, wherein each layer includes compressed bit-streams corresponding to passes, from the identified set for that layer, that have not been included in any previous layers.

The present invention provides a method for encoding rate-distortion information along with a JPEG2000 compressed image. The advantage of such encoding is that the rate-distortion information can subsequently be used to optimally transcode the compressed image. In particular, the advantage of the invention is that it allows optimal transcoding of a JPEG2000 compressed bitstream for arbitrary bit-rates, resolutions and viewing conditions.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

The present invention relates to compression of a digital image. Although there are other techniques well known in the art, the present invention will be described with respect to the technique set forth in the JPEG2000 image compression standard. The present description will be directed in particular to attributes forming part of, or cooperating more directly with, the algorithm in accordance with the present invention. Attributes not specifically shown or described herein may be selected from those described in "Information Technology—JPEG2000 Image Coding System, ISO/IEC International Standard 15444-1, ITU Recommendation T.800", or otherwise known in the art. In the following description, a preferred embodiment of the present invention would ordinarily be implemented as a software program, although those skilled in the art will readily recognize that the equivalent of such software may also be constructed in hardware. Given the system and methodology as described in the following materials, all such software implementation needed for practice of the invention is conventional and within the ordinary skill in such arts. If the invention is implemented as a computer program, the program may be stored in conventional computer readable storage medium, which may comprise, for example; magnetic storage media such as a magnetic disk (such as a floppy disk or a hard drive) or magnetic tape; optical storage media such as an optical disc, optical tape, or machine readable bar code; solid state electronic storage devices such as random access memory (RAM), or read only memory (ROM); or any other physical device or medium employed to store a computer program.

Reference will now be made in detail to the presently preferred embodiment of the invention, an example of which is illustrated in the accompanying drawings. While the invention will be described in connection with a preferred embodiment, it will be understood that it is not intended to limit the invention to that embodiment. On the contrary, it is intended to cover all alternatives, modifications, and equivalents as may be included within the spirit and scope of the invention defined in the appended claims.

Figure 1:
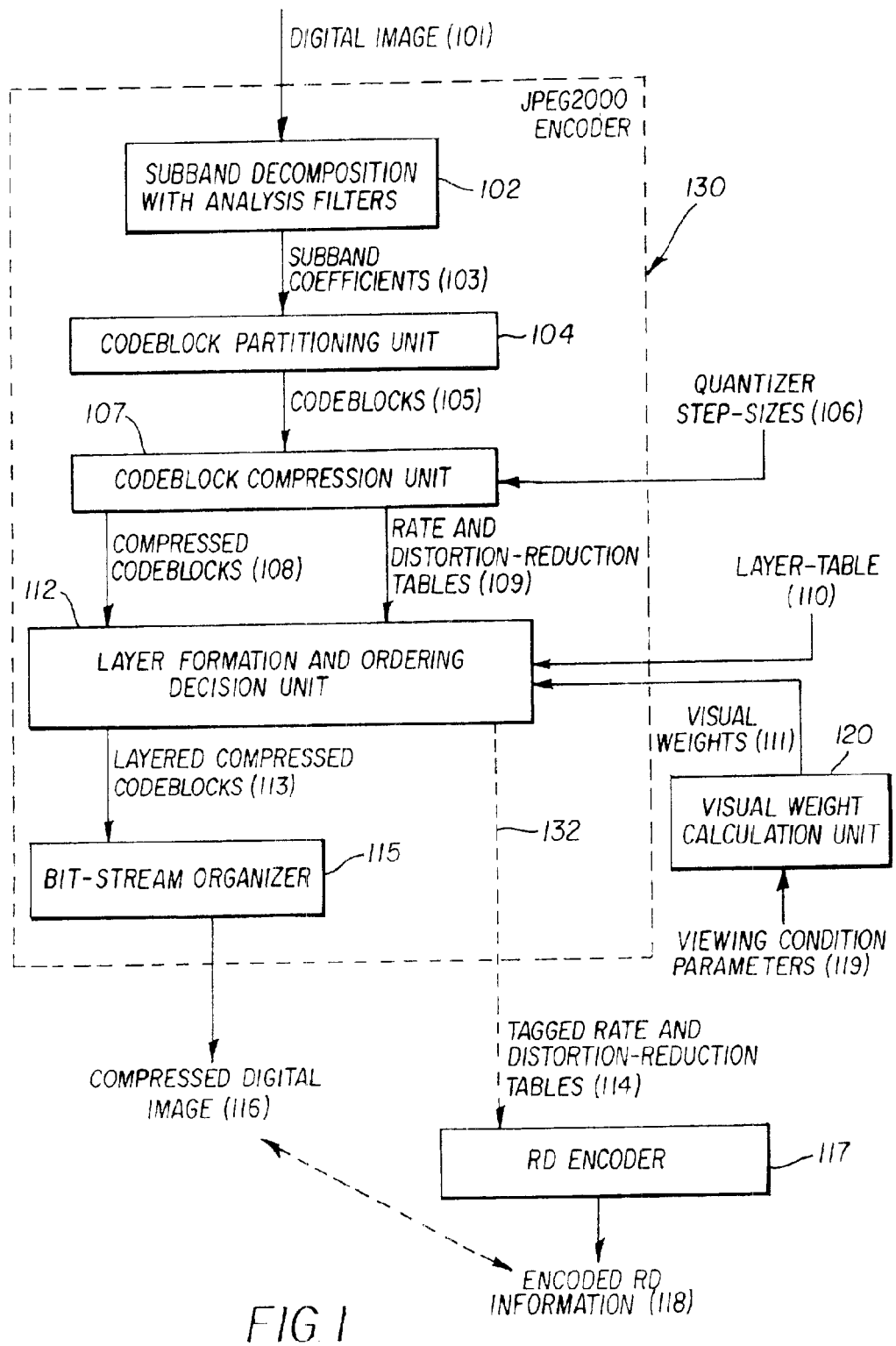
FIG. 1 shows a flow chart of an image encoder according to the present invention.

A flow chart of an image encoder according to the present invention is shown in FIG. 1, wherein the dashed box 130 includes certain aspects of a conventional JPEG2000 encoder. A digital image (101) undergoes subband decomposition (102) by the analysis filters to produce an image representation in terms of subband coefficients (103). If the image has multiple components (e.g., RGB), a luminance-chrominance transformation can be applied to convert it to a YCbCr representation before the subband decomposition step (102). Also, it is possible to divide each component of the image into multiple tiles. But in this preferred embodiment, only a single tile consisting of the entire image is used. The subband coefficients (103) are partitioned into rectangular blocks by the codeblock partitioning unit (104) to produce one or more codeblocks (105). Those skilled in the art would appreciate that partitioning of the subband coefficients is not necessary if only a single codeblock spanning the entire subband is used. Each codeblock is compressed by the codeblock compression unit (107) using the appropriate quantizer step-size (106) to produce compressed codeblocks (108) and rate and distortion-reduction tables (109). For each codeblock, the compressed codeblock bit-stream (108) and the rate and distortion-reduction table (109) are fed to a layer formation and ordering decision unit (112). The other inputs to the layer formation and decision unit (112) are a layer-table (110) containing information about layer formation, and visual weights for the codeblocks (111). The layer-table (110) includes information about the number of layers and criteria for the formation of layers.

The layer formation criterion for each layer is specified in terms of the maximum allowable bit-rate and the desired resolution for that layer. Other criteria such as distortion-rate slope can also be used. The visual weight for each codeblock (111) is determined by the visual weight calculation unit (120) based on user-specified viewing condition parameters (119). The viewing condition parameters can include the viewing distance, the display dpi, ambient light, etc. The two dimensional (2-D) contrast sensitivity function (CSF) of the human visual system (HVS), as described by Jones et al (P. W. Jones, S. Daly, R. S. Gaborski, and M. Rabbani, "Comparative study of wavelet and DCT decomposition with equivalent quantization and encoding strategies for medical images," *Proc. SPIE Medical Imaging '95*, vol. 2431, pp. 571–582) can be used to determine the visual weights from the viewing conditions. Instead of using the 2-D CSF to find the quantizer step-size for a subband for just noticeable distortion as described by Jones et al, the square of the reciprocal of the step-size can be used as a visual weight for all the codeblocks in that subband. Those skilled in the art will appreciate that the visual weights for the codeblocks may be directly specified by the user. In that case, the visual weight calculation unit (120) is absent. Also, in a preferred embodiment, MSE or weighted MSE is used as the distortion metric. Those skilled in the art will appreciate that other distortion metrics are possible as long as the distortion is additive over the codeblocks. For each codeblock, the layer formation and ordering decision unit (112) determines how many coding passes should be included in each layer and produces layered compressed codeblocks (113). The layered compressed codeblocks (113) are fed to the JPEG2000 bit-stream organizer (115) to produce a compressed digital image (116) that is JPEG2000 compliant.

The dashed box in FIG. 1 contains those steps comprising a regular JPEG2000 encoder. The extra functionality provided by the present invention involves the encoding of RD information to facilitate transcoding. For each codeblock, besides determining how many coding passes should be included in each layer and producing layered compressed codeblocks (113), the layer formation and ordering decision unit (112) also produces tables containing tagged rate and distortion-reduction information (114). The tagged rate table is formed by flagging those entries of the rate table corresponding to layer-segment boundaries. The distortion-reduction table is passed unchanged through the layer formation and bit-stream ordering decision unit (112). In particular, although the visual weights are used in the layer formation algorithm, the distortion-reduction values contained in the distortion-reduction table (114) are calculated using the MSE distortion metric, i.e. the MSE is not weighted by the visual weights. (Although decision unit 112 is within the box 130, it should be understood that tagging, as described herein, is not performed by a conventional JPEG2000 encoder. In fact, in a JPEG2000 compliant system, the rate-distortion information used in the layer formation process is discarded.) The RD encoder (117) takes as input on line 132 (which is shown as a broken line 132 to emphasize that such an output is not provided by a conventional JPEG2000 compliant encoder) the tagged rate and distortion-reduction tables and produces encoded RD information (118). Although in its most basic form the RD encoder can store the RD information uncoded, in a preferred embodiment the RD information is entropy encoded by the RD encoder. The encoded RD information (118) is associated with the compressed digital image (116). As such, the encoded RD information (118) may be stored as metadata in the compressed digital image file (116). In a preferred embodiment, however, the encoded RD information (118) is stored as a separate file associated with the corresponding compressed digital image (116).

Figure 2:
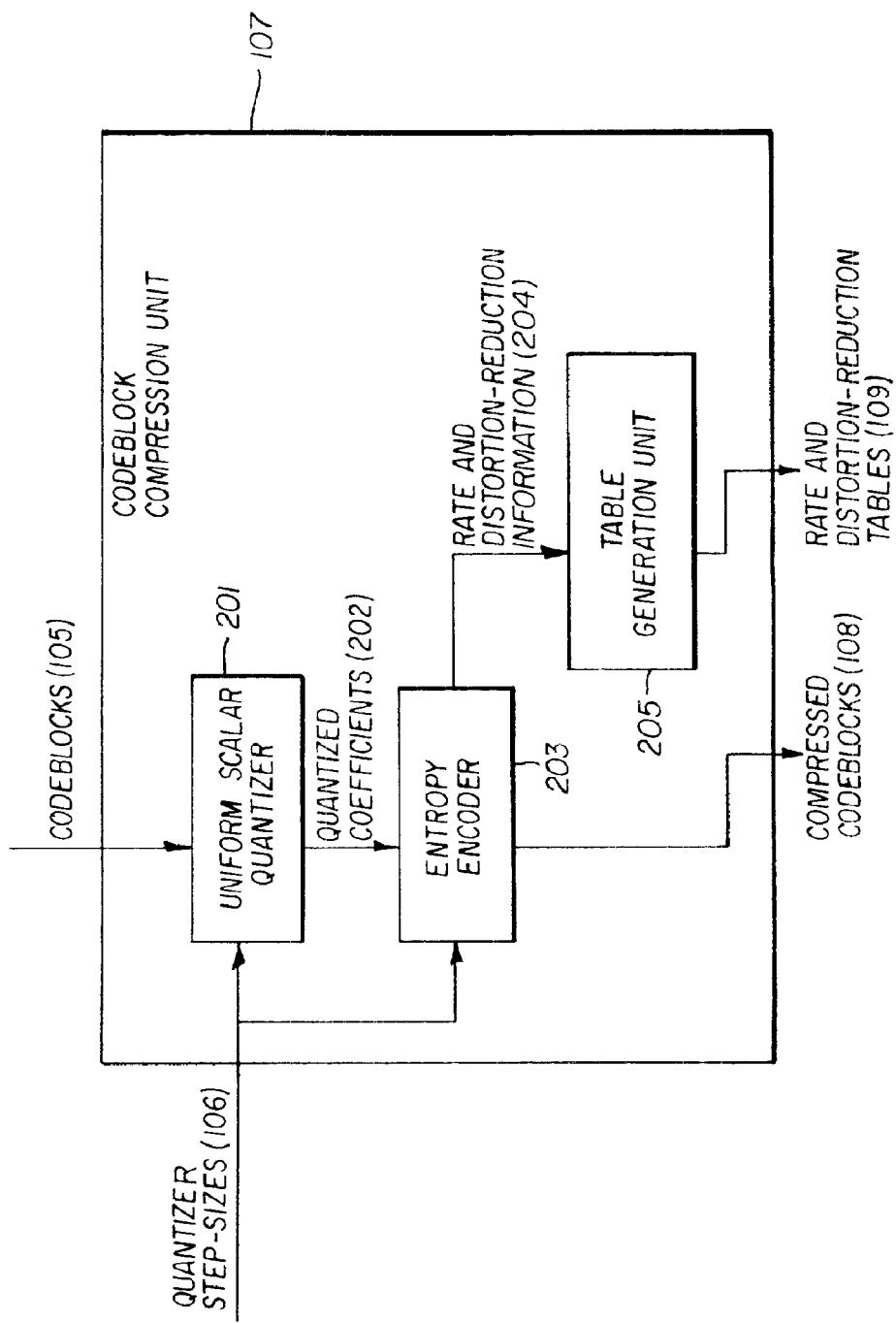
FIG. 2 shows a block diagram of the codeblock compression unit.
Figure 3A:
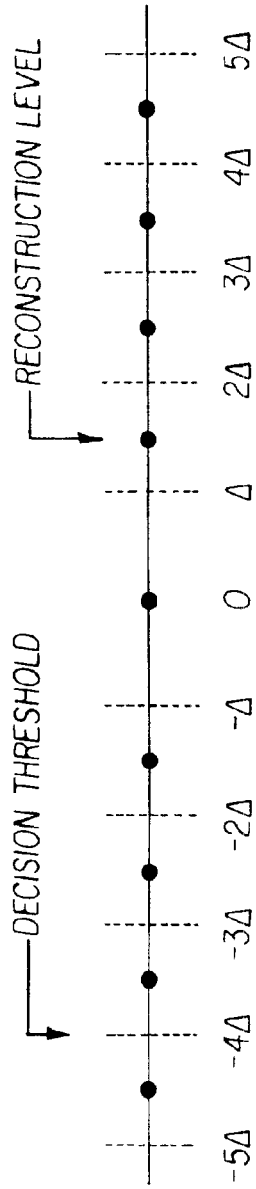
FIGS. 3A and 3B show graphs of the decision thresholds and reconstruction levels for step-sizes of $\Delta$ and $2\Delta$, respectively, for a uniform scalar quantizer with dead-zone.
Figure 3B:
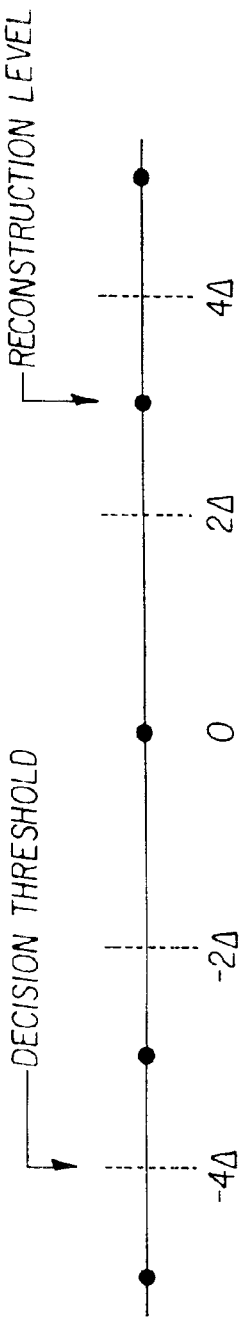

The blocks in FIG. 1 will now be described in greater detail. The codeblock partitioning unit (104) shown in FIG. 1 partitions each subband into a number of rectangular codeblocks. The codeblock compression unit (107) is shown in greater detail in FIG. 2. Each codeblock is quantized with a uniform scalar quantizer (201) to produce a sign-magnitude representation of the indices of quantized coefficients (202). Preferably, a uniform scalar quantizer with a dead-zone is used. FIG. 3A and FIG. 3B show a dead-zone scalar quantizer for step-sizes of $\Delta$ and $2\Delta$, respectively. The same base quantizer step-size is used for all the codeblocks in a given subband, where the step-size for subband i is denoted $\Delta_i$. If the subband analysis and synthesis filters are reversible, the quantization step may be entirely absent.

Suppose that the codeblock being processed is from subband i. Then, the samples from the codeblock are quantized with a uniform scalar quantizer with step size $\Delta_i$ as described above. Suppose that the magnitude of the indices of quantized coefficients is represented by a fixed precision of $A_i$ bits. Let the bits be indexed as 1, 2, . . . , $A_i$, where index 1 corresponds to the most significant bit (MSB) and Ai corresponds to the least significant bit (LSB). The kt bit-plane for the codeblock consists of the $k^{th}$ bit from the magnitude representation of all the indices of quantized coefficients from that codeblock. One interesting property of the scalar quantizer being used is that discarding, or zeroing out, the k least significant bits from the magnitude representation of the index of a quantized coefficient from subband i is equivalent to scalar quantization of that coefficient with a step-size of $2^k \Delta_i$. Thus, if the compressed bit-stream corresponding to the codeblock is truncated so that the data corresponding to the last k bit-planes is discarded, it is possible to reconstruct a more coarsely quantized version of the codeblock. This is known as the embedding property.

For the purpose of entropy coding, a bit-plane for a codeblock is said to be significant if any of the previous bit-planes were significant or the bit-plane has at least one non-zero bit. The entropy encoder (203) codes each significant bit-plane for the codeblock in one or more coding passes. For example, the most significant bit-plane is encoded using a single coding pass. The rest of the significant bit-planes for the codeblock are encoded using three coding passes. In JPEG2000, the MQ arithmetic coder is used as the entropy coder. The entropy coder outputs the compressed codeblock coding pass data (108) as well as the rate and distortion-reduction information (204), using the MSE distortion metric. In addition to being a function of the symbols encoded during that pass, the MSE-based distortion-reduction value for a particular codeblock coding pass is also a function of the quantizer step-size and the L2 norm of the wavelet synthesis waveform for the relevant subband. The table generation unit (205) generates two tables (109) for each codeblock. The first table is a rate table. The $m^{th}$ entry in this table corresponds to the number of bytes needed to include coding passes 1,2, . . . ,m of the codeblock in the bit-stream. The second table is a distortion-reduction table. The $m^{th}$ entry in this table corresponds to the total reduction in distortion resulting from including coding passes 1,2, . . . ,m of the codeblock in the final compressed bit-stream. Even though the encoder may use visual weights and a corresponding visually weighted MSE distortion metric when deciding how to form the layers, the values stored in the distortion-reduction tables are based on MSE distortion metric. In a preferred embodiment, a convex hull analysis is performed on the rate-distortion curve for the codeblock. Coding passes that lie on the convex hull are considered valid truncation points. Coding passes that do not lie on the convex hull are considered invalid truncation points. Table entries in both tables corresponding to invalid truncation points are flagged to indicate that they correspond to invalid truncation points.

The layer formation and ordering decision unit (112) determines the number of coding passes to be included in each layer so that the rate criterion for that layer, as specified by the layer-table (110), is met, and at the same time the overall distortion is minimized. Each coding pass corresponding to a valid truncation point is assigned a distortion-rate slope value. The distortion-rate slope value is a ratio of the distortion-reduction difference and the rate difference between this coding pass and the most recent previous coding pass, which was also a valid truncation point. The distortion-rate slope is weighted by the visual weight (111) for that codeblock. Given two coding passes, the coding pass with a higher distortion-rate slope has higher marginal utility, i.e., for equal increase in rate, the coding pass with a higher distortion-rate slope results in a greater reduction in distortion. Based on the distortion-rate slopes of the coding passes and the rates specified in the layer-table, the layer formation algorithm selects a whole number of coding passes from each codeblock to be included in each layer. The number of coding passes included may vary from codeblock to codeblock and from layer to layer. The final coding pass included in a codeblock-layer must be a valid truncation point. Each codeblock-layer contribution is divided into one or more segments depending on the termination properties of the entropy coder. Segment boundaries occur when coding passes are terminated. Segment boundaries also occur at codeblock-layer boundaries. In normal operation of a JPEG2000 encoder, the codeblock entropy coder is terminated only once after the final coding pass, and hence every codeblock-layer has exactly one segment.

The layer formation and ordering decision unit (112) outputs layered compressed codeblocks (113). The layered compressed codeblocks are processed by the bit-stream organizer (115), which produces a compressed digital image (116). The layer formation and ordering decision unit also outputs tagged rate and distortion-reduction tables (114). The tagged rate table is formed from the input rate table by flagging those coding passes which fall on segment boundaries. Rate information related to coding passes which fall on segment boundaries is contained in header information within the compressed digital image file. Thus these entries are tagged in the rate table to indicate that they do not need to be encoded. The distortion-reduction table contains distortion-reduction values for every coding pass, and is not modified by the layer formation and ordering decision unit. In particular, the distortion-reduction table values are not modified with respect to the visual weights.

Figure 4:
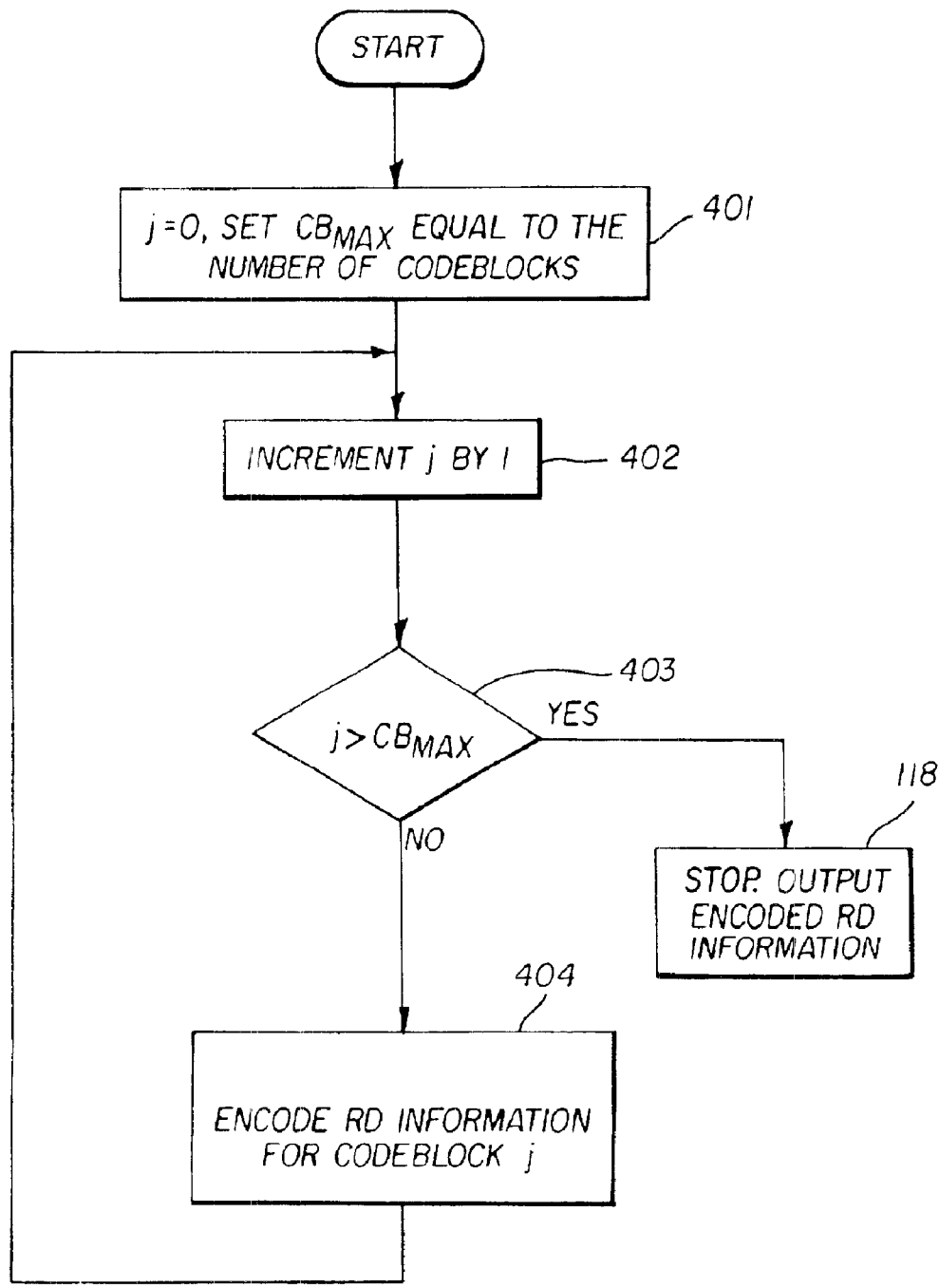
FIG. 4 shows a flow chart of the rate-distortion (RD) information encoder of FIG. 1.
Figure 5:
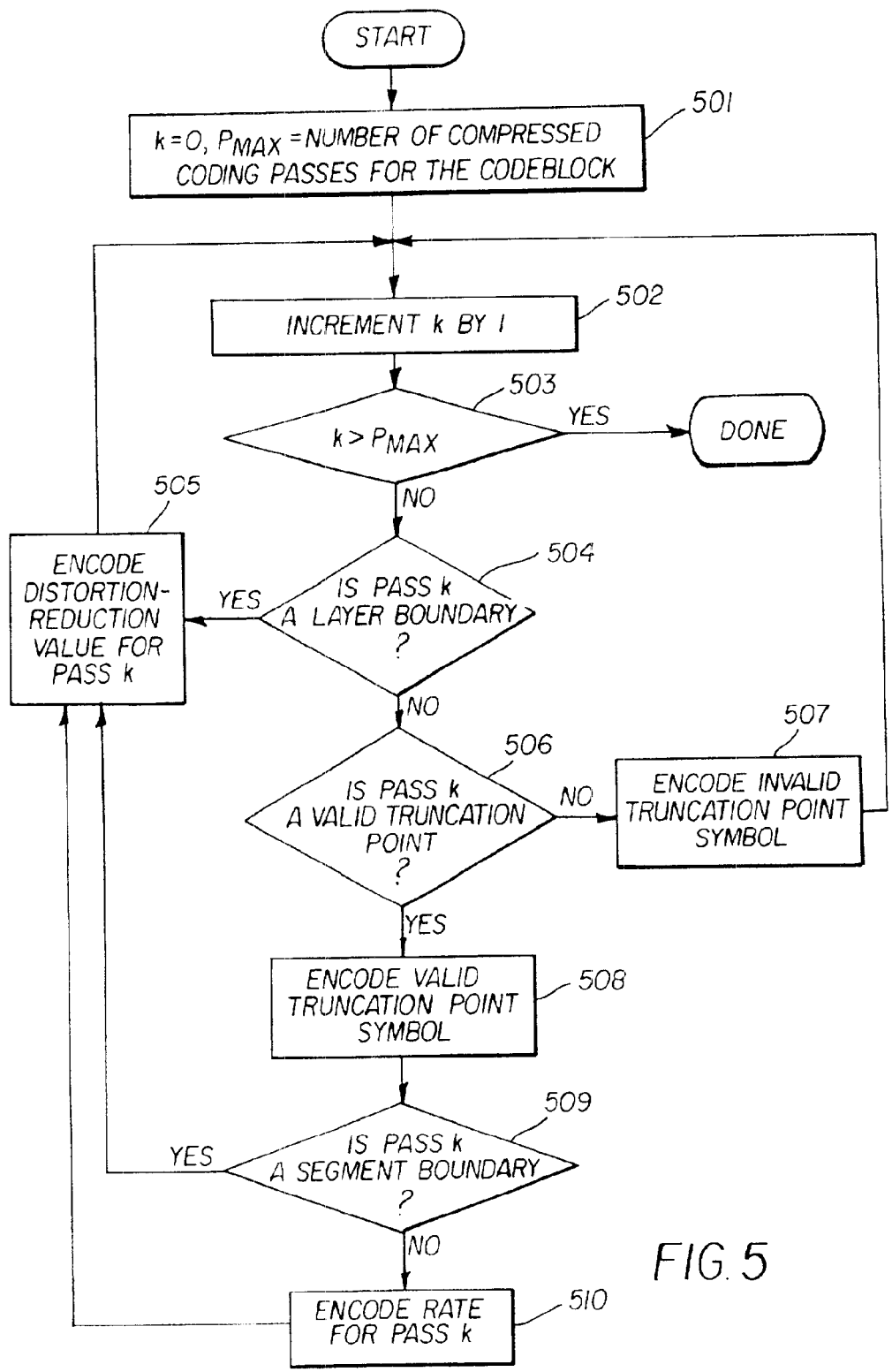
FIG. 5 shows a flow chart of the block "Encode RD information for codeblock j (404)" of FIG. 4.

The tagged rate and distortion-reduction tables are encoded by the RD encoder (117), producing the encoded RD information (118). Note that the encoded form of the RD information may simply be the tagged rate and distortion-reduction information uncoded. However, in a preferred embodiment the RD information is entropy coded. The preferred embodiment of the RD encoder is shown in greater detail in FIG. 4 and FIG. 5. The codeblocks are ordered (401) and processed sequentially (402). Once all codeblocks have been encoded (403), the encoding is complete. The encoding process for each codeblock (404) is described in detail in FIG. 5.

Initially, k is set to 0, and $P_{max}$ is set equal to the number of coding passes in the compressed bit-stream for this codeblock (501). Then, k is incremented by 1 (502). Next, k is compared to $P_{max}$ (503). If k>$P_{max}$, all coding passes have been processed and the encoding of rate-distortion information for this codeblock is complete. Otherwise, each coding pass k is initially checked to see if it falls on a layer boundary (504). A coding pass that falls on a layer boundary is necessarily a valid truncation point. Additionally, it is also a segment boundary. Therefore the corresponding rate does not need to be stored, and flow-control moves directly to the encoding of the distortion-reduction value (505). If coding pass k does not fall on a layer boundary, it is next checked to see if it is a valid truncation point (506). If it is not a valid truncation point, an invalid truncation point symbol is encoded (507) and flow-control returns to step (502). In this case, it is not necessary to encode rate or distortion-reduction values. If a coding pass is not a valid truncation point, it is always grouped with at least one following coding pass during the layer formation algorithm, and its individual rate and distortion-reduction values are not used by the layer formation algorithm. Assuming the coding pass is a valid truncation point, a valid truncation point symbol is coded (508), and the coding pass is next checked to see if it is a segment boundary (509). If it is, the rate information for the coding pass does not need to be stored, and flow-control passes to the encoding of distortion-reduction information. Otherwise, the rate is encoded (510), then the distortion-reduction value is encoded (505), and then the flow-control returns to step (502).

In a preferred embodiment, the truncation point symbol is coded using a single bit, and the rate and distortion-reduction values are each entropy coded using Huffman coding tables. The Huffman coding table used to encode a rate value is similar to that used in a JPEG encoder. The achievable rate values are divided into magnitude categories. A variable length code is used to represent the magnitude categories, and for each individual magnitude category, additional bits are required to uniquely specify a rate value within the magnitude category.

A distortion-reduction value is encoded as follows: first, a rate-distortion slope value is calculated by dividing the distortion-reduction value by the rate value for the corresponding coding pass. A 16-bit logarithmic representation is used for the distortion-rate slope value. It turns out that logarithmic distortion-rate slope values for a codeblock are well-approximated as a linear function of the coding pass. This property is exploited by using a linear function to predict the distortion-rate slope value for each coding pass. Thus, in step (505), each distortion-rate slope value is encoded as a residual difference between the actual value and the linear prediction. In addition, for each codeblock, two 16-bit values, a slope and an offset, which specify the linear function, are also encoded. A Huffman coding table is used to encode the prediction residuals. The prediction residuals are divided into magnitude categories. A variable length code is used to represent the magnitude categories, and for each individual magnitude category, additional bits are required to uniquely specify a prediction residual within the magnitude category. Those skilled in the art will recognize that while it is possible to losslessly encode all 16 bits of precision for distortion-rate slope values, the least significant bits of information may also be discarded prior to encoding. The discarding of least significant bits decreases the size of the encoded RD information at the expense of the precision of the extracted RD information used subsequently in the layer formation algorithm during transcoding.

While the preceding paragraphs detail a preferred embodiment for the encoding of rate and distortion-reduction values, other embodiments are possible, including using arithmetic coding or no entropy coding at all for encoding the rate and distortion-reduction values.

Figure 6:
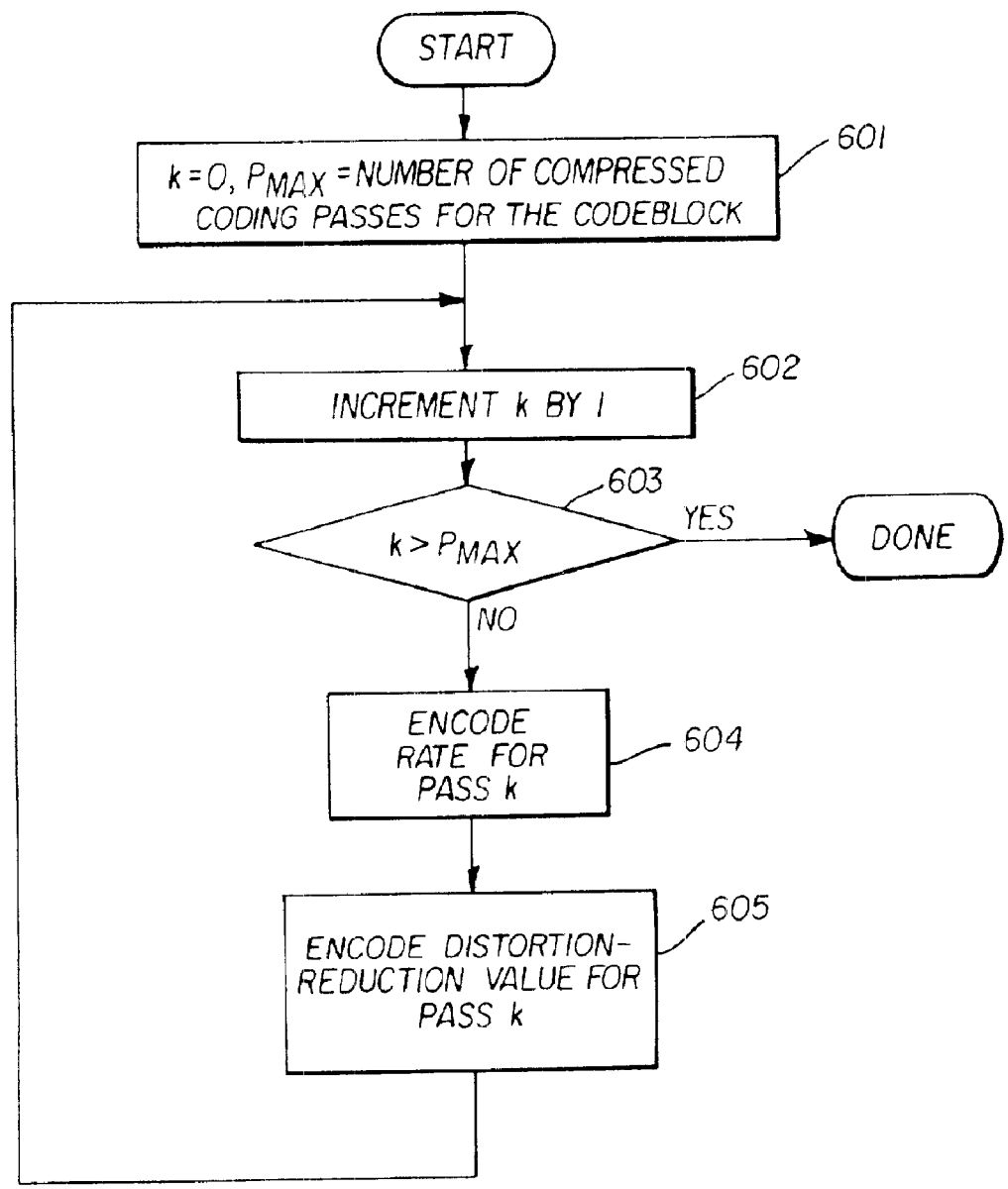
FIG. 6 shows a flow chart of another embodiment of the RD information encoder of FIG. 4.

Another embodiment of the RD codeblock encoder is shown in FIG. 6. As in the preferred embodiment, k is initialized to zero and $P_{max}$ is set equal to the number of coding passes for this codeblock (601). Then k is incremented by 1 (602) and compared to $P_{max}$ (603). If k is greater than $P_{max}$, then the RD information is already completely encoded for the codeblock. Otherwise, the rate (604) and distortion-reduction (605) values for the coding pass are encoded, and flow-control returns to step (602). In the alternative embodiment, rate and distortion-reduction values are encoded for all coding passes, independent of whether or not they correspond to layer boundaries, segment boundaries or invalid truncation points.

A JPEG2000 encoded bit-stream is organized based on specific layer bit-rates and codeblock visual weights. The encoded RD information allows this compressed bit-stream to be subsequently optimally reorganized with respect to any layer bit-rates and visual weights. Without the RD information, this is generally not possible, because the distortion-reduction value associated with each coding pass is not contained in the compressed bit-stream. Also, many of the rate values associated with the coding passes may not be present in the compressed bit-stream. Without this information, the bit-stream can not be optimally reorganized with respect to new layer bit-rates and visual weights.

The encoded RD information allows a JPEG2000 transcoder to recover the original rate and distortion-reduction values that were used during compression. Having access to these values, a layer formation algorithm can optimally form layered compressed codeblocks with respect to any new layer bit-rates and visual weights.

Figure 7:
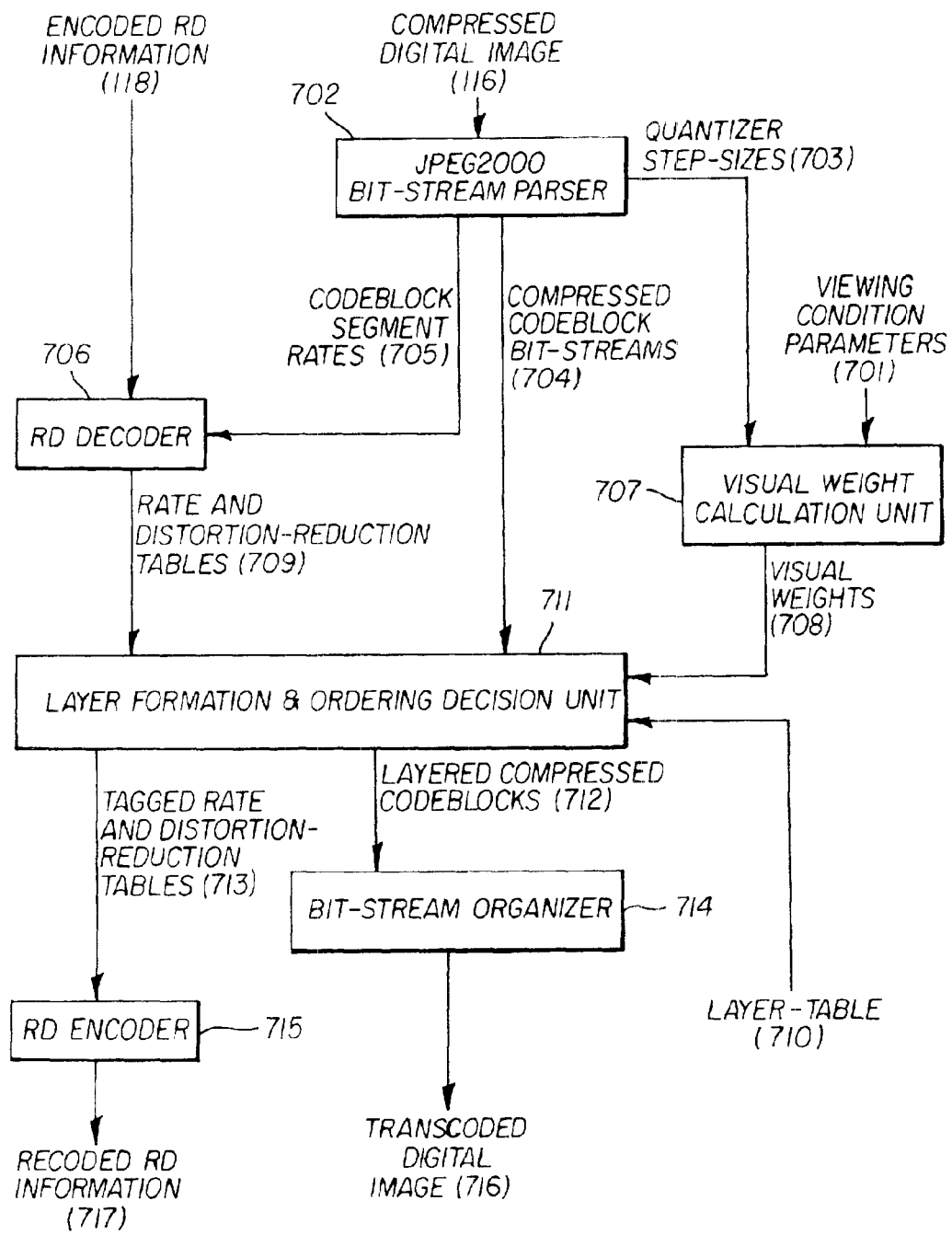
FIG. 7 shows a flow chart for transcoding a JPEG2000 compressed bit-stream according to the present invention.

A flow chart of a JPEG2000 compressed image transcoder according to the present invention is shown in FIG. 7. The compressed digital image is parsed by a JPEG2000 bit-stream parser (702), which extracts the individual compressed codeblock bit-streams (704) as well as the quantizer step-sizes used during compression (703). The parser also extracts the codeblock segment rates that are contained in the header information of the encoded digital image (705), and passes this information to the RD decoder (706).

Figure 8:
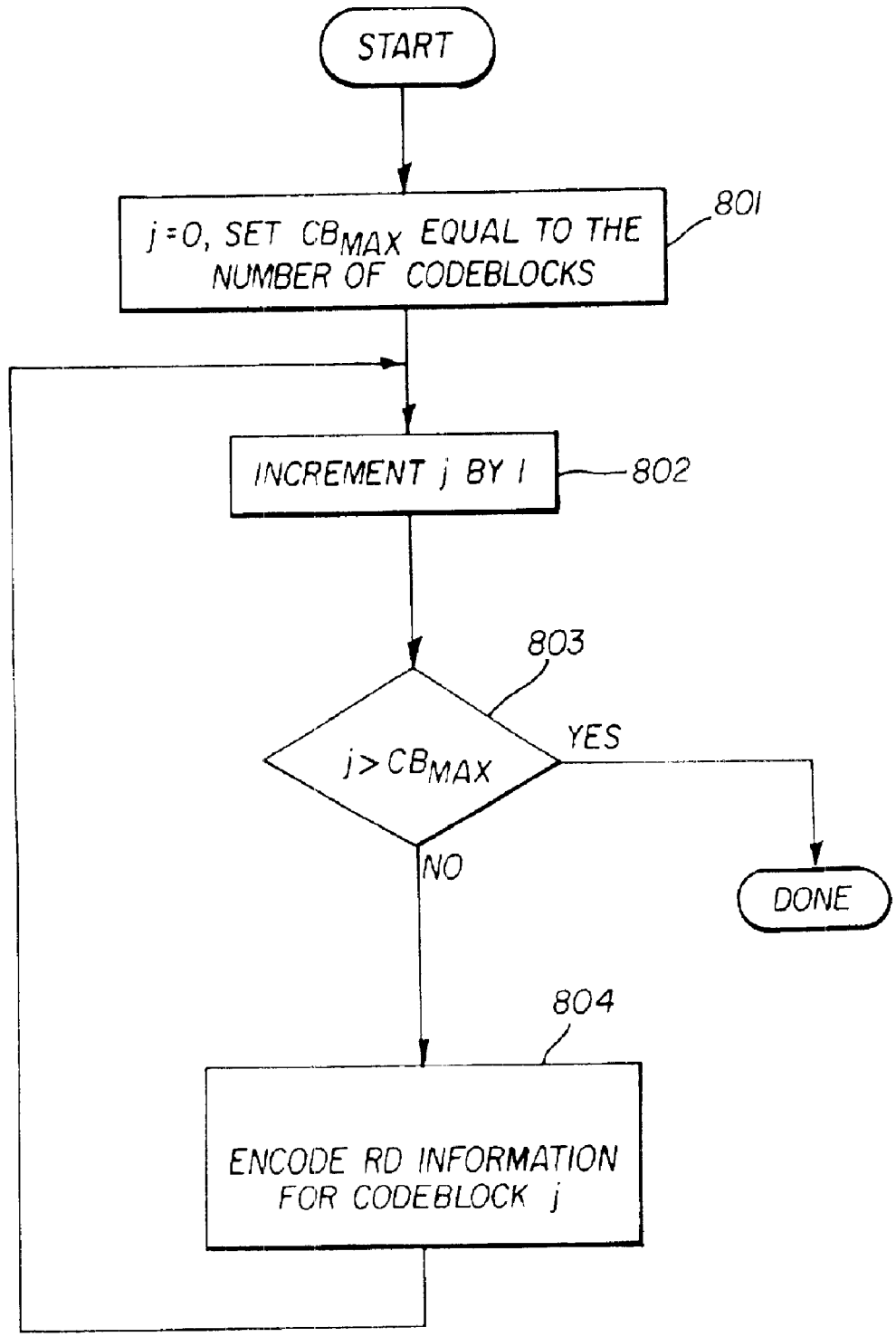
FIG. 8 shows a flow chart of the RD information decoder of FIG. 7.
Figure 9:
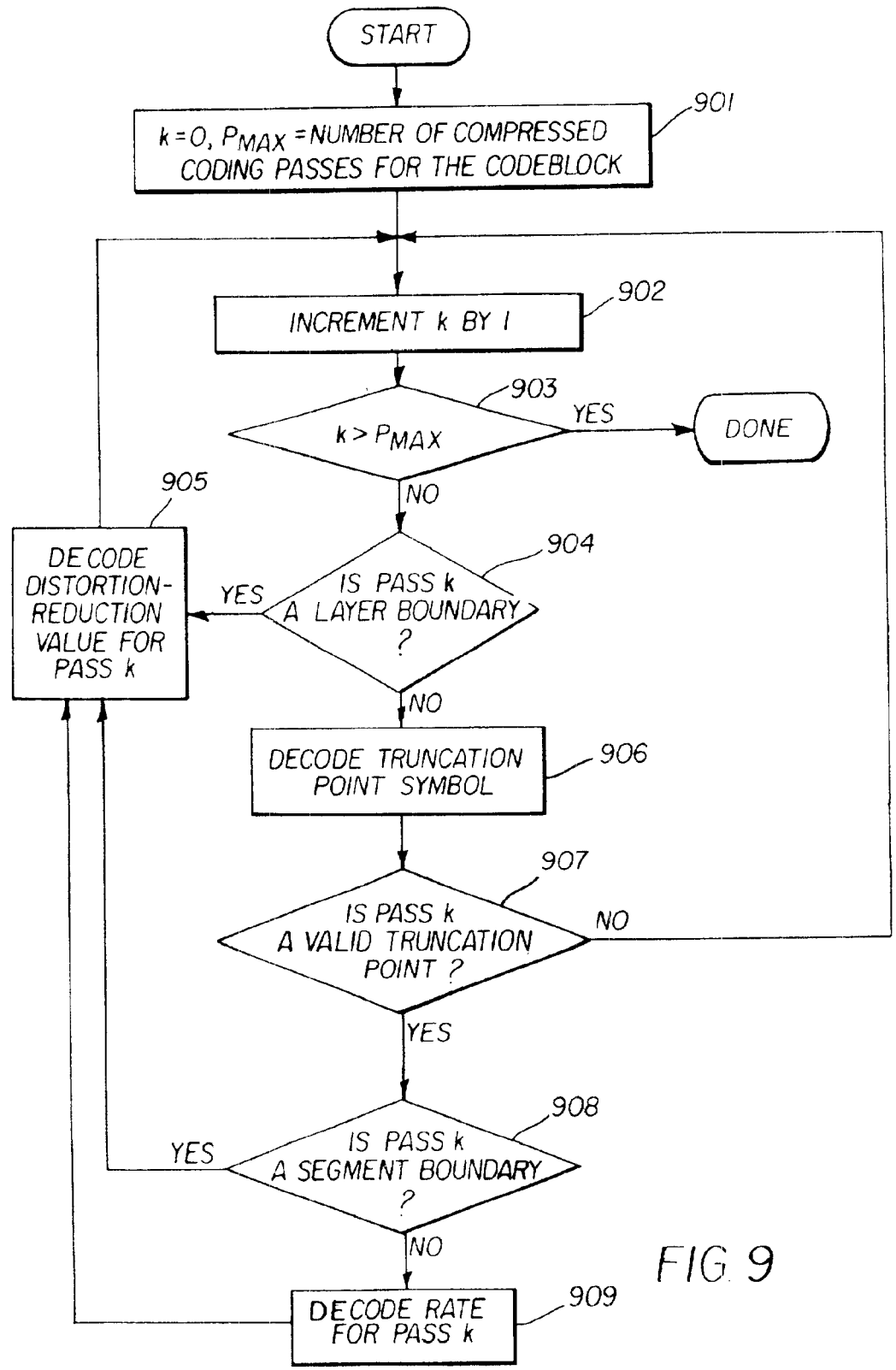
FIG. 9 shows a flow chart of the block "Decode RD information for codeblock j (804)" of FIG. 8.

The RD decoder is described in detail in FIG. 8 and FIG. 9. The RD decoder is initialized by setting j equal to zero and $CB_{max}$ a equal to the number of codeblocks (801). Codeblocks are processed in the order identical to that used by the RD encoder (117). In the next step, j is incremented by 1 (802). Then, j is compared to $CB_{max}$ (803). If all codeblocks have been decoded, then the RD information has been completely decoded. Otherwise, the $j^{th}$ codeblock is decoded using the RD codeblock decoder (804), which is described in detail in FIG. 9.

In a preferred embodiment of the RD codeblock decoder, initially k is set to zero and $P_{max}$ is set equal to the number of coding passes for the codeblock (901). Then k is incremented by 1 (902) and compared to $P_{max}$ (903). If all coding passes have been decoded, then the codeblock has been completely decoded. Otherwise, the current coding pass is decoded. First, the coding pass is checked to see if it corresponds to a layer boundary (904). If so, it is only necessary to decode distortion-reduction information, so flow control is passed to the distortion-reduction decoder (905). Otherwise, a truncation point symbol is decoded (906) and checked to see if the current coding pass is a valid truncation point (907). If it is invalid, rate and distortion-reduction information for this coding pass are not necessary and were not coded, so flow control is passed back to step (902). If it is valid, the codeblock segment rate information is checked to see if the current coding pass is a segment boundary (908). If it is a segment boundary, it is only necessary to decode distortion-reduction information, so flow control is passed to the distortion-reduction decoder (905). Otherwise, the rate for this coding pass is decoded (909). Next, the distortion-reduction value is decoded (905), and then flow control proceeds back to step (902).

Returning to FIG. 7, the quantizer step-sizes (703) are combined with user-specified viewing condition parameters (701) and input to the visual weight calculation unit (707) to compute the new visual weights (708). After this, the transcoder operates identically to the encoder described in FIG. 1. The layer formation and ordering decision unit (711) takes as input: the layer-table (710), visual weights, rate and distortion-reduction tables (709) and compressed codeblock bit-streams (704). It outputs layered compressed codeblocks (712) and tagged rate and distortion-reduction tables (713). Any codeblock coding pass which falls on a segment boundary is flagged in the tagged rate table so that the RD encoder (715) does not encode the rate for that coding pass. The RD encoder produces recoded RD information (717). The layered compressed codeblocks are processed by the bit-stream organizer (714) to produce a transcoded compressed digital image (716). In this embodiment of the JPEG2000 compressed image transcoder, the recoded RD information is produced corresponding to the transcoded compressed image file. If the application is such that the recoded RD information is not required, the RD encoding step (715) may be skipped.

Figure 10:
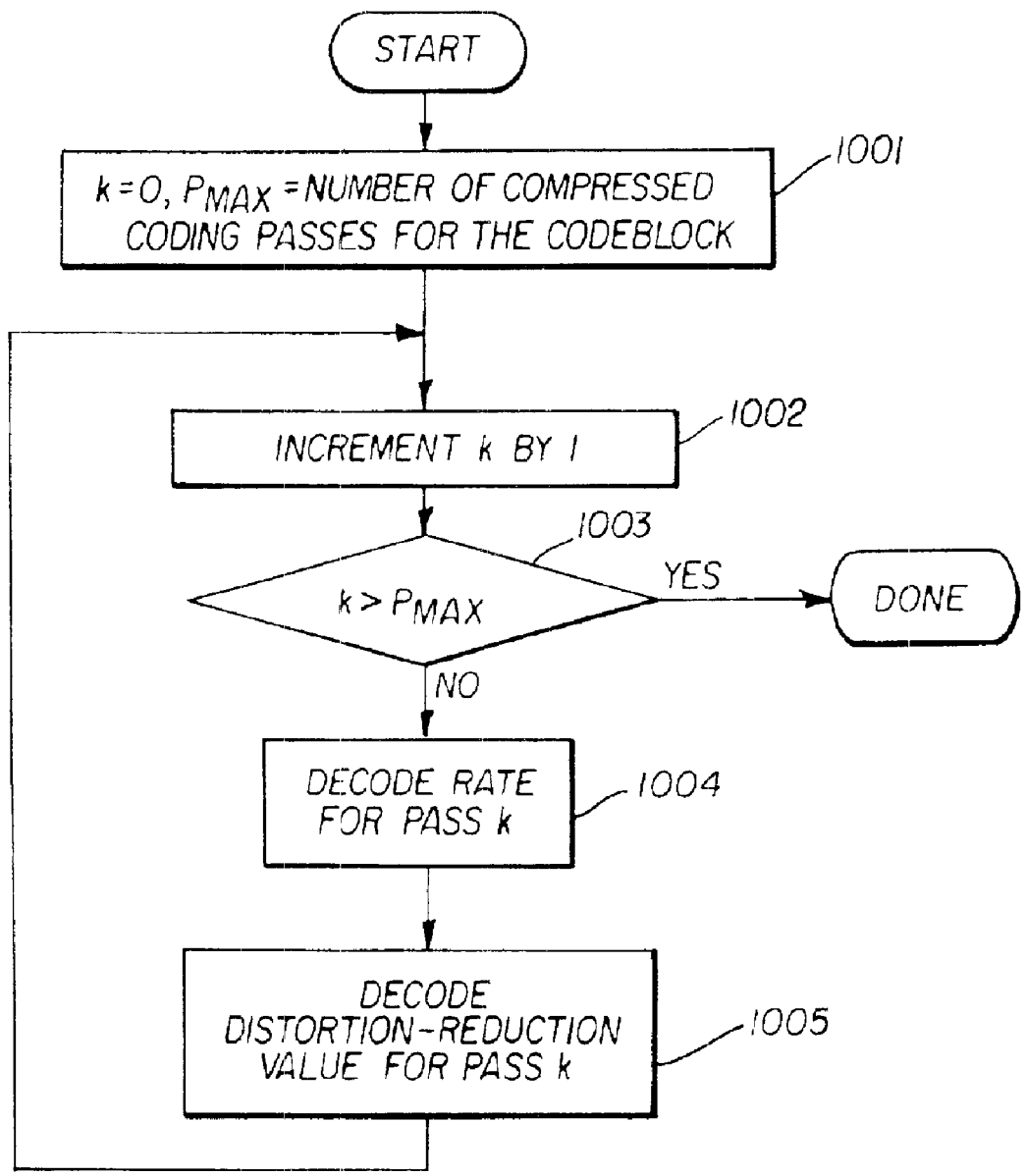
FIG. 10 shows a flow chart of another embodiment of the RD information decoder of FIG. 8.

Another embodiment of the RD codeblock decoder is shown in FIG. 10. This embodiment corresponds to the alternative embodiment of the RD codeblock encoder described in FIG. 6. As in the preferred embodiment of the RD codeblock decoder, k is initialized to zero and $P_{max}$ is set equal to the number of coding passes for this codeblock (1001). Then k is incremented by 1 (1002) and compared to $P_{max}$ (1003). If k is greater than $P_{max}$, then the RD information is already completely decoded for the codeblock. Otherwise, the rate (1004) and distortion-reduction (1005) values for the coding pass are decoded, and flow-control returns to step (1002). In the alternative embodiment, rate and distortion-reduction values are decoded for all coding passes, irrespective of whether they correspond to layer boundaries, segment boundaries or invalid truncation points.

Figure 11:
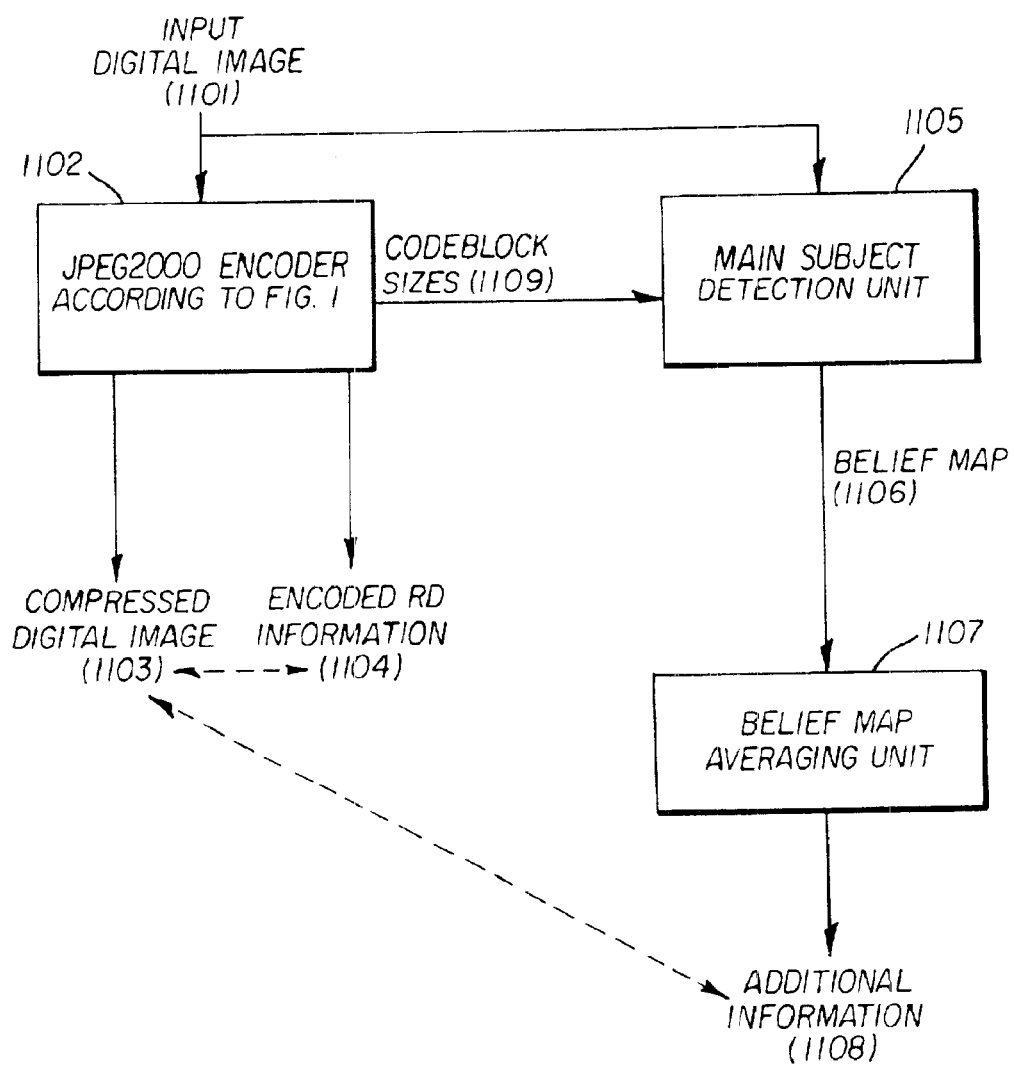
FIG. 11 shows a flow chart of another embodiment of the image encoder according to the present invention.

Another embodiment of the present invention is shown in FIG. 11. An input image (1101) is compressed by a JPEG2000 encoder according to FIG. 1 (1102) to produce a compressed digital image (1103) and associated encoded RD information (1104). In addition, additional information relating to the importance of the photographed subject and corresponding background regions of the digital image is generated. In a preferred embodiment, the additional information is in the form of a main subject belief map. A main subject detection unit (1105), operating on the input digital image (1101), generates a belief map (1106) that provides a measure of the relative importance of different regions in the image, such as subjects and background. The method used by the main subject detection unit (1105) for calculation of belief map (1106) can be, for example, similar to the one described in U.S. Pat. No. 6,282,317, entitled "Method For Automatic Determination Of Main Subjects In Photographic Images," by Luo et al., Aug. 28, 2001.

Each pixel of the input image has a belief value associated with it. Thus it is prohibitively costly to store the main subject belief map in its original form. A belief map averaging unit (1107) extracts information from the belief map that would be useful to a JPEG2000 transcoder. The belief map averaging unit (1107) receives codeblock sizes (1109) from the JPEG2000 encoder. Then, it propagates the belief map to the subband domain and generates additional information (1108) in the form of the average belief value for each codeblock used by the JPEG2000 encoder. The process of calculating the average belief value for each codeblock is described in U.S. patent application Ser. No. 09/898,230, entitled, "A Method For Utilizing Subject Content Analysis For Producing A Compressed Bit Stream From A Digital Image," filed Jul. 3, 2001, by Joshi, et al. The additional information (1108) is associated with the compressed digital image (1103). As such, the additional information may be stored as metadata in the compressed digital image file or in a separate file that is associated with the compressed digital image file. The average belief value for each codeblock, stored as additional information (1108), can be used as an additional input to the visual weight calculation unit (707) in the JPEG2000 transcoder shown in FIG. 7.

Further modification and variation can be made to the disclosed embodiments without departing from the subject and spirit of the invention as defined in the following claims. Such modifications and variations, as included within the scope of these claims, are meant to be considered part of the invention as described.

PARTS LIST

101 digital image
102 subband decomposition with analysis filters
103 subband coefficients
104 codeblock partitioning unit
105 codeblocks
106 quantizer step-sizes
107 codeblock compression unit
108 compressed codeblocks
109 rate and distortion-reduction tables
110 layer-table
111 visual weights
112 layer formation and ordering decision unit
113 layered compressed codeblocks
114 tagged rate and distortion-reduction tables
115 bit-stream organizer
116 compressed digital image
117 RD encoder
118 encoded RD information
119 viewing condition parameters
120 visual weight calculation unit
201 uniform scalar quantizer
202 quantized coefficients
203 entropy encoder
204 table generation unit
401 j=0, set $CB_{max}$ equal to the number of codeblocks
402 Increment j by 1
403 j>$CB_{max}$
404 Encode RD information for codeblock j
501 k=0, $P_{max}$=number of compressed coding passes for the codeblock
502 Increment k by 1
503 k>$P_{max}$
504 Is pass k a layer boundary
505 Encode distortion-reduction value for pass k
506 Is pass k a valid truncation point
507 Encode invalid truncation point symbol
508 Encode valid truncation point symbol
509 Is pass k a segment boundary
510 Encode rate for pass k
601 k=0, $P_{max}$=number of coding passes for the codeblock
602 Increment k by 1
603 k>$P_{max}$
604 Encode rate for pass k
605 Encode distortion-reduction value for pass k
701 viewing condition parameters
702 JPEG2000 bit-stream parser
703 quantizer step-sizes
704 compressed codeblock bit-streams
705 codeblock segment rates
706 RD decoder
707 visual weight calculation unit
708 visual weights
709 rate and distortion-reduction tables
710 layer-table
711 layer formation and ordering decision unit
712 layered compressed codeblocks
713 tagged rate and distortion-reduction tables
714 bit-stream organizer
715 RD encoder
716 transcoded digital image
717 recoded RD information
801 j=0, set $CB_{max}$ equal to the number of codeblocks
802 Increment j by 1
803 j>$CB_{max}$
804 Decode RD information for codeblock j
901 k=0, $P_{max}$=number of compressed coding passes for the codeblock
902 Increment k by 1
903 k>$P_{max}$
904 Is pass k a layer boundary
905 Decode distortion-reduction value for pass k
806 Decode truncation point symbol
907 Is pass k a valid truncation point
908 Is pass k a segment boundary
909 Decode rate for pass k
1001 k=0, $P_{max}$=number of compressed coding passes for the codeblock
1002 Increment k by 1
1003 k>$P_{max}$
1004 Decode rate for pass k
1005 Decode distortion-reduction value for pass k
1101 Input digital image
1102 JPEG2000 encoder according to FIG. 1
1103 Compressed digital image
1104 Encoded RD information
1105 Main subject detection unit
1106 Belief map
1107 Belief map averaging unit
1108 Additional information
1109 Codeblock sizes

What is claimed is:

1. A method for preserving rate-distortion information associated with the compression of an input digital image, said method comprising the steps of:

(a) decomposing the input digital image to produce a plurality of subbands, each subband having a plurality of subband coefficients;

(b) quantizing the plurality of subband coefficients of each subband of the decomposed input digital image to produce a quantized output value for each subband coefficient of each subband;

(c) partitioning each subband into a plurality of codeblocks;

(d) forming at least one bit-plane from the quantized output values of subband coefficients of each codeblock of each subband;

(e) entropy encoding each bit-plane of each codeblock for each subband in at least one pass to produce a compressed bit-stream corresponding to each pass, wherein each codeblock is entropy encoded independently of the other codeblocks;

(f) computing a rate value and a distortion-reduction value for each pass;

(g) providing a layer-table that specifies the number of expected layers and the criteria for forming the layers;

(h) using the computed rate and distortion-reduction values to identify a set of passes and their corresponding compressed bit-streams that are included in each layer specified in the layer-table;

(i) producing tagged rate and distortion-reduction tables from the computed rate values and distortion reduction values, wherein the rate values corresponding to passes which are segment boundaries are tagged;

(j) ordering the compressed bit-streams corresponding to passes into layers to produce a compressed digital image file, wherein each layer includes compressed bit-streams corresponding to passes, from the identified set for that layer, that have not been included in any previous layers; and (k) storing the tagged rate and distortion-reduction tables as rate-distortion information in association with the compressed digital image file.

2. The method according to claim 1 wherein step (k) comprises:

(a) encoding the tagged rate and distortion-reduction tables to produce encoded rate-distortion information, wherein the rate-distortion information comprises rate values and distortion-reduction values for passes contained in the compressed bit-stream; and (b) associating the encoded rate-distortion information with the compressed digital image.

3. The method according to claim 1 wherein the rate-distortion information comprises rate and distortion-reduction values for all passes contained in the compressed bit-stream.

4. The method according to claim 1 wherein the rate-distortion information comprises distortion-reduction values only for passes contained in the compressed image that are valid truncation points, and rate values only for passes contained in the compressed image that that are valid truncation points but are not segment boundaries.

5. The method according to claim 2 wherein the rate-distortion information is entropy encoded.

6. The method according to claim 1 wherein the rate-distortion information is stored uncoded.

7. The method according to claim 2 wherein the encoded rate-distortion information is stored as metadata contained in the compressed digital image file.

8. The method according to claim 2 wherein the encoded rate-distortion information is stored as a separate file associated with the corresponding compressed digital image file.

9. The method according to claim 1 wherein the compressed digital image is subsequently transcoded to a given bit-rate and resolution, using its associated stored rate and distortion-reduction information, comprising the steps of:

(a) parsing the encoded digital image file to extract the compressed codeblock bit-streams and codeblock segment rates;

(b) extracting the rate and distortion-reduction values for the codeblock passes from the encoded rate-distortion information;

(c) providing a layer-table that specifies the number of expected layers and the criteria for forming the layers;

(d) calculating visual weights based on user-specified viewing condition parameters and quantizer step-sizes for the subbands;

(e) using the extracted rate and distortion-reduction information and the visual weights to identify a set of passes and their corresponding compressed bit-streams that are included in each layer specified in the layer-table;

(f) producing tagged rate and distortion-reduction tables, wherein the rate values corresponding to passes which are segment boundaries are tagged; and (g) ordering the compressed bit-streams corresponding to passes into layers to produce a transcoded digital image, wherein each layer includes compressed bit-streams corresponding to passes, from the identified set for that layer, that have not been included in any previous layers.

10. The method according to claim 9 further comprising the steps of:

(h) encoding the rate-distortion information to produce recoded rate-distortion information, wherein the rate-distortion information comprises rate values and distortion-reduction values for passes contained in the compressed bit-stream; and (i) associating the recoded rate-distortion information with the transcoded digital image.

11. The method according to claim 1 wherein the criteria for the formation of layers in the layer-table is specified in terms of maximum allowable rate and resolution.

12. The method according to claim 9 wherein the criteria for the formation of layers in the layer-table is specified in terms of maximum allowable rate and resolution.

13. A method for encoding rate-distortion information associated with the compression of an input digital image, said method comprising the steps of:

(a) performing JPEG2000 compliant compression of the input digital image, wherein a series of compressed coding passes are aggregated in a layer formation process to form layers and wherein rate values and distortion reduction values are computed for each pass and used in the layer formation process to form a compressed bit-stream;

(b) producing tagged rate and distortion-reduction tables from the computed rate values and distortion reduction values, wherein the rate values corresponding to passes which are segment boundaries are tagged;

(c) encoding the tagged rate and distortion-reduction tables to produce encoded rate-distortion information, wherein the rate-distortion information comprises rate values and distortion-reduction values for passes contained in the compressed bit-stream; and (d) associating the encoded rate-distortion information with the compressed digital image.

14. The method according to claim 13 wherein the compressed digital image is subsequently transcoded using its associated rate and distortion-reduction information.

15. A computer program product embodied in a computer readable medium for performing the method of claim 1.

16. A computer program product embodied in a computer readable medium for performing the method of claim 13.

17. The method according to claim 13 further comprising the steps of:

(e) generating additional information relating to the importance of photographed subject and corresponding background regions of the digital image; and (f) storing the additional information in association with the compressed digital image.

18. The method according to claim 17 wherein step (e) comprises:

(a) generating a main subject belief map containing a continuum of belief values relating to the importance of the subject and background regions in the digital image;

(b) generating an average belief value for each codeblock in the input digital image; and (c) associating the additional information in the form of the average belief value for each codeblock, with the compressed digital image.

19. The method according to claim 18 wherein the compressed digital image is subsequently transcoded to a given bit-rate and resolution, using its associated stored rate-distortion information, comprising the steps of:

(a) parsing the encoded digital image file to extract the compressed codeblock bit-streams and codeblock segment rates;

(b) extracting the rate and distortion-reduction values for the codeblock passes from the encoded rate-distortion information;

(c) providing a layer-table that specifies the number of expected layers and the criteria for forming the layers;

(d) calculating visual weights based on the additional information in the form of average belief value for each codeblock, user-specified viewing condition parameters, and quantizer step-size for each subband;

(e) using the extracted rate and distortion-reduction information and the visual weights to identify a set of passes and their corresponding compressed bit-streams that are included in each layer specified in the layer-table;

(f) producing tagged rate and distortion-reduction tables, wherein the rate values corresponding to passes which are segment boundaries are tagged; and (g) ordering the compressed bit-streams corresponding to passes into layers to produce a transcoded digital image, wherein each layer includes compressed bit-streams corresponding to passes, from the identified set for that layer, that have not been included in any previous layers.

* * * * *